US009244638B2

(12) United States Patent
Okada

(10) Patent No.: US 9,244,638 B2
(45) Date of Patent: Jan. 26, 2016

(54) PRINT SERVER, PRINTING SYSTEM, PRINT MANAGEMENT PROGRAM, AND PRINT MANAGEMENT METHOD

(71) Applicant: SEIKO EPSON CORPORATION, Tokyo (JP)

(72) Inventor: Hiromu Okada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/557,703

(22) Filed: Dec. 2, 2014

(65) Prior Publication Data

US 2015/0254028 A1 Sep. 10, 2015

(30) Foreign Application Priority Data

Mar. 10, 2014 (JP) ................................ 2014-045988

(51) Int. Cl.
*G06K 15/02* (2006.01)
*G06F 3/12* (2006.01)

(52) U.S. Cl.
CPC ............ *G06F 3/1208* (2013.01); *G06F 3/1206* (2013.01); *G06F 3/1242* (2013.01); *G06F 3/1268* (2013.01); *G06K 15/1843* (2013.01); *G06K 15/1849* (2013.01); *G06K 15/1873* (2013.01); *G06K 15/1876* (2013.01)

(58) Field of Classification Search
None
See application file for complete search history.

(56) References Cited

U.S. PATENT DOCUMENTS

| | | | | |
|---|---|---|---|---|
| 6,734,994 | B2 * | 5/2004 | Omori | G06F 3/1288 358/1.13 |
| 6,738,841 | B1 * | 5/2004 | Wolff | 710/62 |
| 7,079,276 | B2 * | 7/2006 | Kimura | 358/1.15 |
| 7,228,339 | B2 * | 6/2007 | Yamamoto et al. | 709/217 |
| 7,725,355 | B2 * | 5/2010 | Mitani | G06Q 30/0603 345/619 |
| 7,978,360 | B2 * | 7/2011 | Tamai | G06F 3/1204 358/1.1 |
| 7,990,569 | B2 * | 8/2011 | Hino | H04N 1/00347 358/1.15 |
| 2002/0041394 | A1 * | 4/2002 | Aoki | 358/1.15 |
| 2003/0053122 | A1 * | 3/2003 | Kinoshita | 358/1.15 |
| 2004/0201860 | A1 | 10/2004 | Nakaoka et al. | |
| 2004/0223186 | A1 * | 11/2004 | Ito | 358/1.16 |
| 2005/0024666 | A1 * | 2/2005 | Ohyama et al. | 358/1.13 |
| 2012/0081731 | A1 * | 4/2012 | Suzuki | 358/1.13 |
| 2015/0029552 | A1 * | 1/2015 | Nishizawa | 358/1.15 |

FOREIGN PATENT DOCUMENTS

JP 3685201 B2 8/2005
JP 2013-141021 A 7/2013

* cited by examiner

*Primary Examiner* — Dung Tran
(74) *Attorney, Agent, or Firm* — Global IP Counselors, LLP

(57) ABSTRACT

A print server connected to printers includes a job data receiving unit configured to receive job data subject to printing, a first conversion unit, an instruction receiving unit, a second conversion unit, and a transmission unit. The first conversion unit is configured to convert the job data into intermediate image data having a pixel count of a minimum pixel count or less among pixel counts of print data to be input to each of the printers. The instruction receiving unit is configured to, after the job data is received, receive an instruction specifying a printing execution printer. The second conversion unit is configured to generate the print data corresponding to the printing execution printer by converting the intermediate image data to data of the pixel count to be input to the printing execution printer. The transmission unit is configured to transmit the print data to the printing execution printer.

7 Claims, 5 Drawing Sheets

PRINT SERVER, PRINTING SYSTEM, PRINT MANAGEMENT PROGRAM, AND PRINT MANAGEMENT METHOD

CROSS-REFERENCE TO RELATED APPLICATIONS

This application claims priority to Japanese Patent Application No. 2014-045988 filed on Mar. 10, 2014. The entire disclosure of Japanese Patent Application No. 2014-045988 is hereby incorporated herein by reference.

BACKGROUND

1. Technical Field

The present invention relates to a print server, a printing system, a print management program, and a print management method.

2. Related Art

From the past, technology is known by which after a user transmits job data subject to printing to a print server, by the user operating the printer or a mobile terminal to send execution instructions specifying a printer to the print server, only a specified user is able to receive the printed matter output from the printer. This technology is called lead-in printing. For example, noted in Japanese Patent No. 3685201, the print server that receives the job data converts the job data to print data of a general purpose format such as PDF or the like and stores it, and when it receives execution instructions after that, print data is transmitted to the indicated printer. Noted in Japanese Unexamined Patent Publication No. 2003-141021 is an item for which the print server that receives the job data converts the job data to intermediate image data and stores it, and when it receives execution instructions after that, it converts the intermediate image data to print data adapted to the indicated printer and transmits that. As noted in Japanese Patent No. 3685201 and Japanese Unexamined Patent Publication No. 2003-141021, before receiving execution instructions, by converting the job data to print data that can be processed by the printer, or to intermediate image data with a small processing volume when converting to print data that can be processed by the printer, it is possible to shorten the time required from execution instruction to printing start.

However, with the technology noted in Japanese Patent No. 3685201, there is the problem that it is only possible to apply this to a printer compatible with general purpose formats such as PDF or the like. Also, with the technology noted in Japanese Unexamined Patent Publication No. 2003-141021, there is the problem that degradation of the image quality occurs during conversion from the intermediate image data to print data. In specific terms, for example, when the image is reduced by resolution conversion from the intermediate image data to print data, there are cases when fine lines are lost or damaged.

SUMMARY

The present invention was created to address these problems, and one object is to suppress image quality degradation with lead-in printing.

To achieve the object noted above, the print server that is connected to a plurality of printers comprises a job data receiving unit configured to receive job data subject to printing, a first conversion unit configured to convert the job data into intermediate image data that can be converted to mutually different print data adapted to each of plurality of the printers, an instruction receiving unit configured to, after the job data is received, receive an execution instruction for which one or more of the plurality of the printers is specified as the printing execution printer corresponding to that job data, a second conversion unit configured to generate print data adapted to that printing execution printer when the printing execution printer is specified, and a transmission unit configured to transmit the print data to the printing execution printer. The print data corresponding to the printing execution printer is generated by the first conversion unit generating the intermediate image data to have a pixel count of the minimum pixel count or less among the pixel count to be input to the plurality of printers for the job data, and the second conversion unit converting the intermediate image data to data of the pixel count to be input to the printing execution printer.

With the present invention, job data is converted to intermediate image data of a pixel count that is not reduced according to the printer resolution or the like when converting from intermediate image data to print data, so it is possible to suppress image quality degradation with lead-in printing. The instruction for selecting the printing execution printer can be received from that printing execution printer, or can be received from a device other than that printing execution printer (e.g. a mobile information terminal).

With the print server for achieving the object noted above, it is possible to have it so that the first conversion unit is further configured to convert to the intermediate image data that is not dependent on printing conditions, the instruction receiving unit is further configured to receive the printing conditions, and the second conversion unit is further configured to generate the print data adapted to the printing conditions and the printing execution printer.

When applying this constitution, it is possible to do lead-in printing with any printing conditions. With selection of the printing conditions, modes can be considered such as selecting color printing or black and white printing, or selecting one sided printing or both sided printing.

With the print server for achieving the object noted above, it is possible to have it so that the instruction receiving unit is further configured to receive the printing conditions including a page count of the job data allocated per page of print medium, and the second conversion unit is further configured to, when the job data allocated per page of the print medium is one page, generate the print data by expanding the intermediate image data by an equal magnification or greater, and when the job data allocated per page of the print medium is two pages or greater, generate the print data by reducing the intermediate image data.

When applying this constitution, if the job data allocated per print medium page is one page, then image quality degradation is suppressed because the image is not reduced during conversion from intermediate image data to print data. On the other hand, assuming a case when the user intentionally attempts to do reduced printing, when intermediate image data is generated that is not reduced during conversion to print data, when the job data allocated per page of print medium is one page, the expansion magnitude of the image during conversion from intermediate image data to print data is too large, and in fact that image quality is degraded. When applying this constitution, when generating intermediate image data before the printing conditions are selected, when the job data allocated per page of print medium by the printing conditions being selected is two pages or more, intermediate image data of a pixel count for which the image is reduced during conversion from intermediate image data to print data is generated, so it is possible to suppress image quality degradation.

With the print server for achieving the object noted above, it is possible to have it so that a plurality of printing execution printers each of which is configured to execute the printing of the job data are selected, the second conversion unit is further configured to generate the print data for each of the printing execution printers, and the transmission unit is further configured to transmit the corresponding print data to each of the printing execution printers.

When applying this constitution, it is possible to execute printing with a plurality of printers based on one job data.

With the print server for achieving the object noted above, it is possible to have it so that there is further equipped a job management unit configured to correlate and store the intermediate image data and identification information, and correlate the identification information and the execution instruction when the execution instruction is received.

When applying this constitution, the user is able to manage the job data using identification information, so it is possible to prevent another person who is not the user who transmitted the job data from obtaining the printing results. Also, the job data identifier can be unique to each job data, or can be unique to each user.

The function of each unit noted in the claims can be realized using hardware resources for which the function is specified by the structure itself, by hardware resources for which the function is specified by a program, or a combination thereof. Also, the functions of each of these units are not limited to being realized by mutually physically independent hardware resources. Furthermore, the present invention can be established as a printing system, as a print management method, as a print management program, or as the recording medium of a print management program. Of course, the recording medium of the computer program can be an electromagnetic recording medium, can be a magneto-optical recording medium, or can be any recording medium developed in the future.

BRIEF DESCRIPTION OF THE DRAWINGS

Referring now to the attached drawings which form a part of this original disclosure.

DETAILED DESCRIPTION OF EXEMPLARY EMBODIMENTS

Following, we will describe modes of the present invention while referring to the attached drawings. In each drawing, the same code numbers are given to corresponding constitutional elements, and redundant explanations are omitted.

1. First Embodiment 1-1 Overall Constitution

Figure 1:
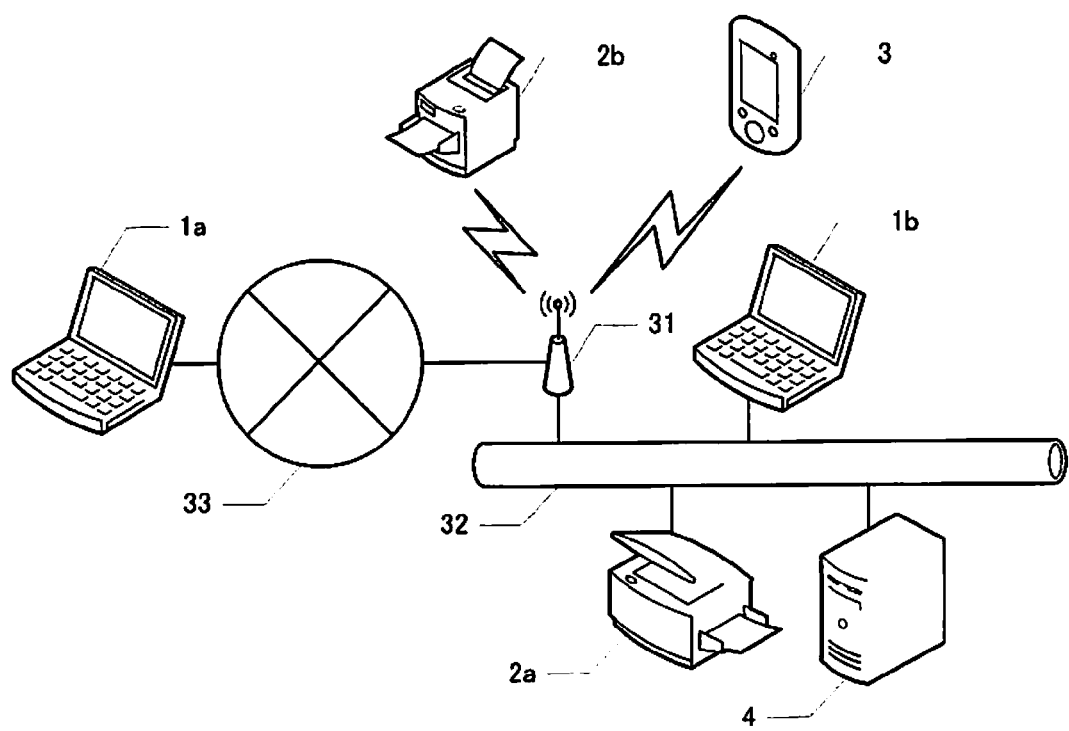
FIG. 1 is a system configuration diagram of an embodiment of the present invention.

FIG. 1 shows the overall constitution of a printing system as an embodiment of the present invention. The printing system is equipped with a plurality of printers 2a and 2b and a print server 4, and based on job data transmitted from a PC 1a, a PC 1b, a smart phone 3 or the like, printing is executed by any of the printers specified by the user at the execution instruction stage after the job data is transmitted. With this embodiment, the printers 2a and 2b are printers registered in the print server 4, and are items that differ in terms of the range of printing conditions that can be set such as paper size, resolution, margin and the like. Here, a communication terminal that transmits job data means a client terminal, and the communication terminal that transmits execution instructions means an instruction terminal. Of course, it goes without saying that it is possible to register three or more printers with the print server 4, and it is possible to share the printers registered with the print server 4 with three or more clients. With this embodiment, the printer for executing printing is assumed to be specified as the printing execution printer by the user near that printer, and any of the PC 1b, the smart phone 3, the printers 2a or 2b can be the instruction terminal. However, the print server 4 that receives the execution instruction from the instruction terminal can be separated from the instruction terminal, and it is also possible to receive execution instructions from the instruction terminal not only using a communication method with the communication range limited spatially such as with a LAN 32, Wi-Fi Direct (registered trademark), Bluetooth (registered trademark), IrDA or the like, but also using a communication method using a public communication line such as the internet 33 or the like. Specifically, the printers 2a and 2b and the print server 4 constituting the printing system can be connected by the LAN 32 or the like, and can also be connected by the internet 33 or the like. Also, since we also assume that job data is transmitted from a client terminal in a location separated from the printer, the client terminal and the print server 4 can be connected by the LAN 32 and can also be connected via the Internet 33. Therefore, any of the PC 1a, the PC 1b, and the smart phone 3 can be the client terminal.

1-2. Print Server Constitution

Figure 2:
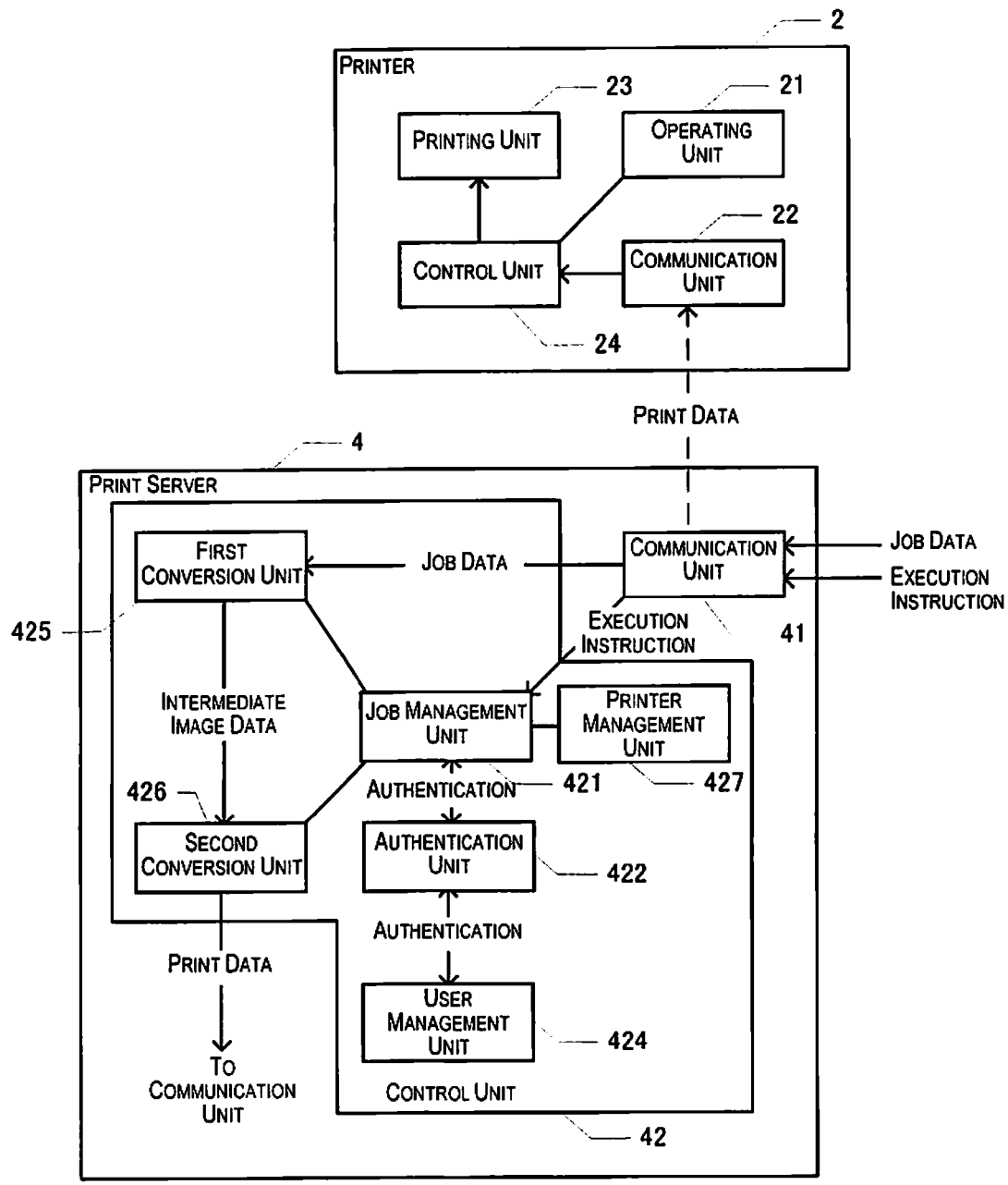
FIG. 2 is a block diagram of an embodiment of the present invention.

As shown in FIG. 2, the print server 4 is equipped with a communication unit 41 and a control unit 42. The communication unit 41 that functions as the job data receiving unit and the transmission unit has a communication function in compliance with the Ethernet (registered trademark) standard. The control unit 42 is equipped with a processor, a main storage device, an input/output interface, an external storage device and the like, and by executing the print management program stored in the external storage device, it functions as a first conversion unit 425, a second conversion unit 426, a job management unit 421, an authentication unit 422, a user management unit 424, and a printer management unit 427.

The printer management unit 427 receives registration of printers constituting the printing system, and stores those with the registered printer identifiers, the network addresses, and the specifications correlated with the user's identification information.

The communication unit 41 receives the job data subject to printing from the client terminal. All the communication terminals that transmit job data to the print server 4 can be handled as client terminals, or the communication terminals compliant with a specific standard such as Wi-Fi Direct Service or the like can be handled as client terminals, but with this embodiment, only the communication terminals for which a specific printing program is installed are handled as client terminals. Any format, such as text, bit map, vectors or the like can be used for job data.

The first conversion unit 425 converts job data into intermediate image data that can be converted to mutually different print data adapted respectively to the printers registered correlated with the identification information of the user who transmitted the job data. With this embodiment, the printers 2a and 2b are registered to the identification information of one specific user, and the first conversion unit 425, without depending on printing conditions, generates intermediate image data that can be converted to print data that corresponds to the printer 2a and also to print data that corresponds to the printer 2b. The file format for the intermediate image data of this embodiment is PNG, but it is also possible to convert to any bit map format such as JPEG, GIF or the like.

The job management unit 421 correlates the intermediate image data generated by the first conversion unit 425 with identification information and stores it. The identification information is acceptable as long as it is information for which it is possible to input execution instructions correlated with job data transmitted oneself, and can be unique to each user, can be unique to each job data, or can be given by the job management unit 421 for each job data and have notification given to the client terminal. With this embodiment, the user management unit 424 stores identification information that is unique to each user for each printer. Specifically, before the user uses the printing system, a procedure is required to correlate the user's identification information to the printer and register it. By doing this, it is possible to restrict use of the printer for each printer and for each user. Here, it is also possible do management using a pass phrase set by the user as authentication information. The pass phrase can be a temporary pass phrase set by the user for each job data, but with this embodiment, when the user correlates the identification information to the printer and registers it, he also sets a pass phrase correlated to the identification information, and this is stored by the user management unit 424.

The communication unit 41, after receiving the job data, receives the execution instruction for which one or both of printer 2a and 2b as the printing execution printer corresponding to that job data and the printing conditions are specified. The execution instruction can be an item that specifies the printing execution printer and the printing conditions at one time, or can be an item that specifies the printing execution printer after the printing conditions are specified in a range that can be handled by both printers 2a and 2b, but with this embodiment, it is an item that specifies the printing conditions after the printing execution printer is specified.

The job management unit 421 manages the intermediate image data correlated with the identification information. In specific terms, the communication sequence of the print server 4 and the instruction terminal is controlled so that the execution instructions for which the job data is specified is correlated to the identification information and received, and the intermediate image data correlated to the execution instruction is converted to print data. With this communication sequence, the authentication unit 422 references the identification information and pass phrase stored by the user management unit 424 and the identification information and pass phrase transmitted from the instruction terminal, and notifies the comparison results to the job management unit 421.

When the printing execution printer and the printing conditions are specified, the second conversion unit 426 converts the intermediate image data to print data adapted to that printing execution printer and printing conditions. The print data is generated so as to be adapted to printing conditions such as the set paper size, resolution, margin and the like. For example, when the job data allocated per page of printing paper is one page, the second conversion unit 426 generates print data by expanding the intermediate image data by an equal magnitude or greater, and when the job data allocated per page of print medium is 2 pages or greater, it generates print data by reducing the intermediate image data. Also, when a plurality of printing execution printers are selected, the second conversion unit 426 generates print data for each printing execution printer.

1-3. Printer Constitution

As shown in FIG. 2, the printers 2a and 2b are equipped with a printing unit 23, a control unit 24, a communication unit 22, and an operating unit 21. The communication unit 22 receives print data. Any communication method is acceptable for the communication unit 22, but with this embodiment, it has a communication function compliant with the Ethernet standard and IEEE 802.1. The printing unit 23 has a function of forming images using ink, toner or the like on a print medium such as paper or the like based on the print data. The printing method of the printing unit 23 can be any method, such as the inkjet method, electro photographic method, heat sublimation or the like. The operating unit 21 is equipped with a touch panel display for inputting various types of instructions to the control unit 24. The control unit 24 is equipped with a processor, a main storage device, an input/output interface, an external storage device and the like, and by executing firmware stored in the external storage device, controls the communication unit 22, the operating unit 21, and the printing unit 23.

1-4. Print Management Method

Figure 3:
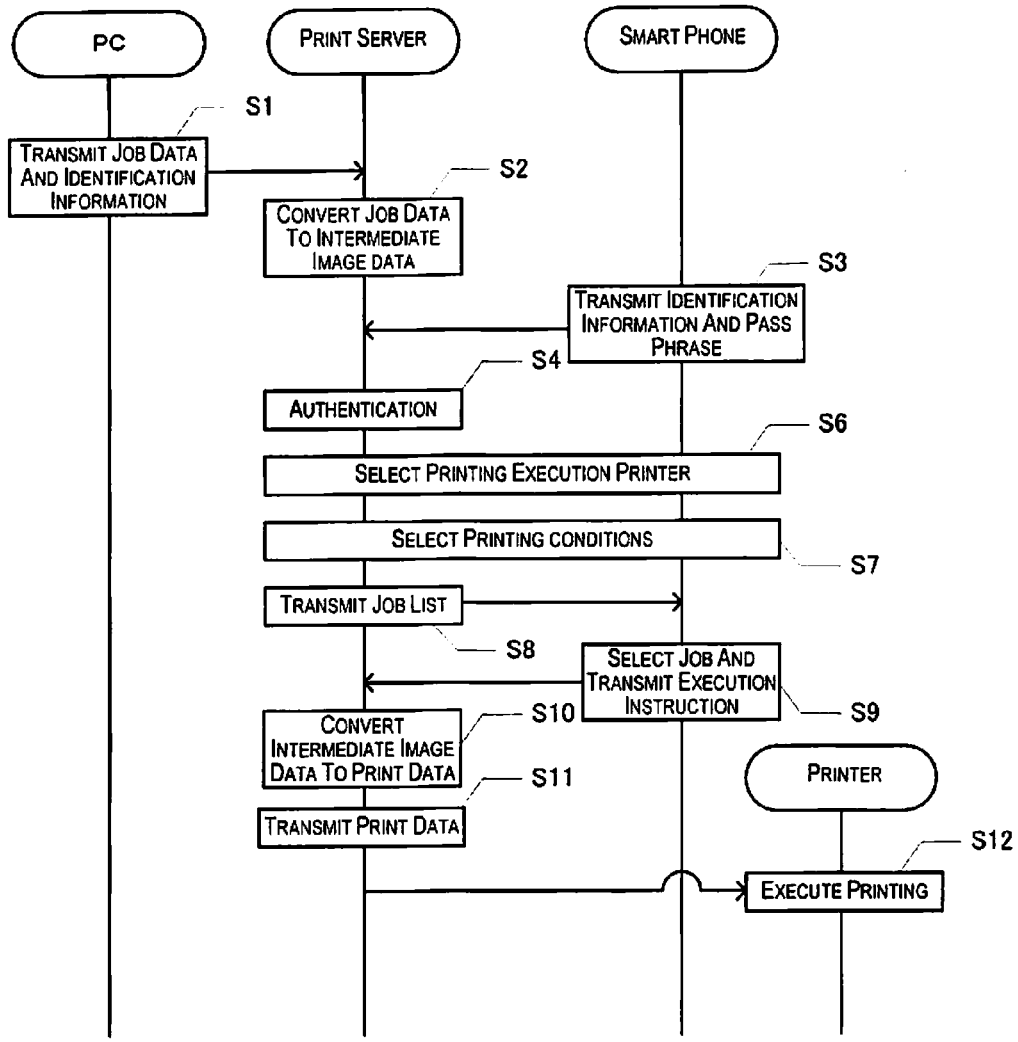
FIG. 3 is a sequence diagram of an embodiment of the present invention.

We will describe a first embodiment of the print management method using the print server 4 based on the sequence diagram shown in FIG. 3. As has already been described, any of the PC 1a, PC 1b, or the smart phone 3 can be the client terminal, and any of the PC 1b, the smart phone 3, the printer 2a or 2b can be the instruction terminal, but here, we will describe a case where the PC 1b is the client terminal, and the smart phone 3 is the instruction terminal. As has already been described, with the process shown in FIG. 3 advancing as a prerequisite, it is necessary for the user identification information and pass phrase, the printer 2a and 2b network address, specifications and the like to be registered in the print server 4.

To start, the user transmits the job data and identification information from the PC 1b to the print server 4 (S1). In specific terms, when the user activates the printing program installed in the PC 1b, the printing program displays on the display an operating screen for specifying the data subject to printing. The printing program can be an item that, like a typical printer driver, can have files opened using any application program specified as the subject of printing, or, like a file system, can have any file specified as the data subject to printing. When the user specifies the data subject to printing, he transmits the specified data as the job data to the print server 4 set in the print program. The identification information can be input by the user for each job data transmission, or can be registered in the print program in advance.

When the print server 4 receives the job data and identification information, it converts the job data to intermediate image data, correlates it to the identification information and stores the intermediate image data (S2). The intermediate image data can be stored in the main storage device, or can be stored in a non-volatile external storage device.

Here, supposing that the specifications of the printers 2a and 2b are as noted in table 1 hereafter, we will describe a list of specific examples regarding the format and size of the intermediate image data generated by the first conversion unit 425 by rendering. The standard paper size, standard margin, and standard resolution are items corresponding to the default values presented to the user when setting the printing conditions.

TABLE 1

|  | Printer 2a | Printer 2b |
|---|---|---|
| Standard resolution (vertical, horizontal) | $x_1, y_1$ | $x_2, y_2$ |
| Highest resolution (vertical, horizontal) | $X_1, Y_1$ | $X_2, Y_2$ |
| Standard paper size (vertical, horizontal) | $h_1, w_1$ | $h_2, w_2$ |
| Maximum paper size (vertical, horizontal) | $H_1, W_1$ | $H_2, W_2$ |
| Standard margin (top, bottom, left, right) | $u_1, e_1, l_1, r_1$ | $U_2, e_2, l_2, r_2$ |
| Minimum margin (top, bottom, left, right) | $U_1, E_1, L_1, R_1$ | $U_2, E_2, L_2, R_2$ |
| Color handling | Full color | Black and white |
| Allocated print handling | 2 surfaces, 4 surfaces | None |
| Both sides print handling | Yes | None |
| Print control language | A and B | A |

The pixel count of the intermediate image data is calculated based on the specifications of the printers 2a and 2b registered in the print server 4, and the job data page size, and is the minimum pixel count among the pixel counts to be input to the printers 2a and 2b for the job data. The pixel count to be input to the printers 2a and 2b differs according to the printing conditions, so what kind of printing conditions the intermediate image data pixel count will be set for differs according to the design concept.

Figure 4A:
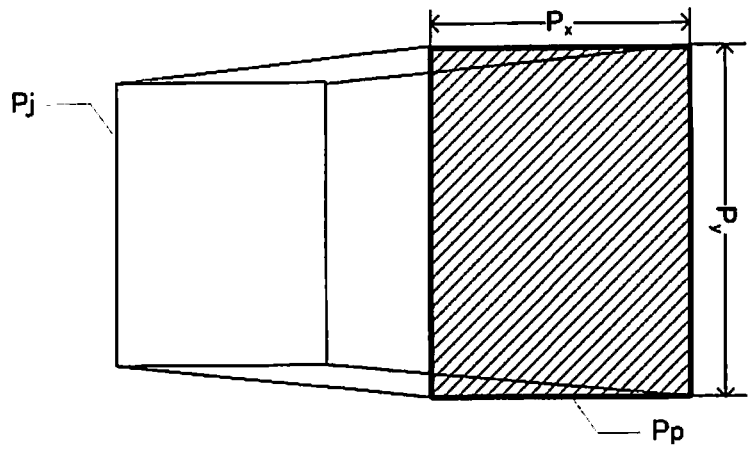
FIGS. 4A and 4B are schematic diagrams of an embodiment of the present invention.

In light of that, first, we will describe an item for which the pixel count to be input to the printers 2a and 2b is determined with the maximum pixel count that can be respectively output by the printer 2a and 2b as the standard. As shown in FIG. 4A, when the aspect ratio of the job data page Pj matches the aspect ratio of the pixel count of the area Pp that can be printed by the printers 2a and 2b, the pixel count $P_1$ to be input to the printer 2a and the pixel count $P_2$ to be input to the printer 2b for one page of job data are according to the formulas below.

$$P_1(x,y)=((W_1-L_1-R_1)\times X_1,(H_1-U_1-E_1)\times Y_1)$$

$$P_2(x,y)=((W_2-L_2-R_2)\times X_2,(H_2-U_2-E_2)\times Y_2)$$

Figure 4B:
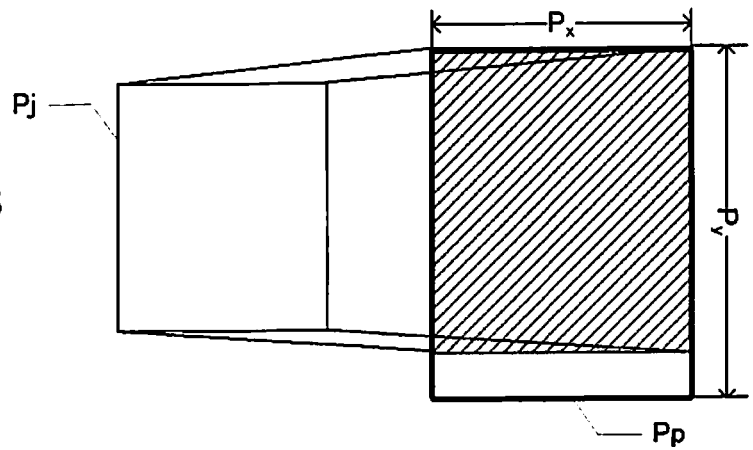

As shown in FIG. 4B, when the aspect ratio of the job data page Pj does not match the aspect ratio of the pixel count of the area Pp that can be printed by the printers 2a and 2b, the job data page Pj does not come out from the area Pp, and the pixel count of the area for which the left and right or the top and bottom of the job data page Pj overlaps at two opposite facing sides of the area Pp (cross hatched area) becomes the pixel count to be input to the printers 2a and 2b.

Next, we will describe an item for which the pixel count to be input to the printers 2a and 2b are determined based on the standard of the pixel count to be input when printing with the printers 2a and 2b on the default settings. As shown in FIG. 4A, when the aspect ratio of the job data page Pj matches the aspect ratio of the pixel count of the area Pp that can be printed by the printers 2a and 2b, the pixel count $P_1$ to be input to the printer 2a and the pixel count $P_2$ to be input to the printer 2b for one page of job data are according to the formulas below.

$$P_1(x,y)=((w_1-l_1-r_1)\times X_1,(h_1-u_1-e_1)\times Y_1)$$

$$P_2(x,y)=((w_2-l_2-r_2)\times X_2,(h_2-u_2-e_2)\times Y_2)$$

As shown in FIG. 4B, when the aspect ratio of the job data page Pj does not match the aspect ratio of the pixel count of the area Pp that can be printed by the printers 2a and 2b, the job data page Pj does not come out from the area Pp, and the pixel count of the area for which the left and right or the top and bottom of the job data page Pj overlaps at two opposite facing sides of the area Pp (cross hatched area) becomes the pixel count to be input to the printers 2a and 2b.

Of the pixel count to be input respectively to the printers 2a and 2b determined in this way, the smaller pixel count becomes the pixel count of the intermediate image data. The user can set the pixel count to be input to the printers 2a and 2b as being calculated using the maximum pixel count that can be output by the printers 2a and 2b as the standard, or being calculated with the pixel count output by the printers 2a and 2b with the default settings as the standard.

The user who transmitted the job data from the PC 1b holds the smart phone 3 and moves it near the printer by which to have printing executed, and transmits the identification information and the pass phrase from the smart phone 3 to the print server 4 (S3). In specific terms, the user operates the smart phone 3, and when he activates the communication program for communicating with the print server 4, an operating screen for inputting the identification information and the pass phrase is displayed on the display by the communication program. When the user inputs the identification information and the pass phrase, the identification information and the pass phrase are transmitted from the smart phone 3 to the print server 4.

When the identification information and the pass phrase are received, the print server 4 performs authentication of the user (S4). In specific terms, the authentication unit 422 determines whether or not the identification information and pass phrase registered in advance in the user management unit 424 matches the identification information and pass phrase received from the smart phone 3. When these identification information and pass phrase do not match, the communication sequence between the print server 4 and the smart phone 3 is not started (the smart phone 3 is not able to log in). It is possible to hold the corresponding intermediate image data until the job management unit 421 is able to convert the received identification information and pass phrase that matches the identification information and pass phrase registered in advance in the user management unit 424 to print data, and also possible to determine a holding time for the intermediate image data, and to delete the intermediate image data when the holding time has elapsed.

When the user is authenticated, the communication sequence between the print server 4 and the smart phone 3 is started, and the print server 4 and the smart phone 3 have the user select the printing execution printer (S5). In specific terms, the print server 4 transmits to the smart phone 3 a list of printer identifiers correlated with the authenticated identification information and stored by the user management unit. The smart phone 3 that has received the list of printer identifiers displays that list, and has the user select the identifier of the printing execution printer. When the printing execution printer identifier is selected, the smart phone 3 transmits to the print server 4 the selected printing execution printer identifier.

When the printing execution printer is selected, the print server 4 and the smart phone 3 have the user select the printing conditions (S6). In specific terms, the print server 4 transmits to the smart phone 3 the settable printing conditions based on the printer specifications correlated to the identifier of the selected printing execution printer stored by the printer management unit 427. The smart phone 3 that received the settable printing conditions displays the settable printing conditions, and has the user select the printing conditions. When the printing conditions are selected, the smart phone 3 transmits the selected printing conditions to the print server 4.

When a plurality of printers are selected as the printing execution printer, the printing conditions are selected for each printing execution printer.

When the printing conditions are selected, the print server 4 transmits to the smart phone 3 the list of jobs that can be printed by the user (S8). The job list is a list of file names of job data corresponding to intermediate image data correlated to the identification information received at step S3 and stored by the job management unit 421.

The smart phone 3 that received the job list has the user select the job subject to printing, and when the job is selected, transmits the execution instructions for the selected job to the print server 4 (step S9). The execution instructions include the file name of the job data corresponding to the selected job. The printing execution printer and the printing conditions are specified by the point at which the execution instructions are transmitted, and the execution instructions are transmitted in a format for which they can be correlated to the printing execution printer and the printing conditions. In specific terms, for example, it is possible to give identifiers for each series of communication sequences from receiving of the identification information to receiving of the execution instructions.

When it receives the execution instructions, the print server 4 converts the intermediate image data corresponding to the received execution instructions to print data based on the selected printer specifications and the printing conditions (S10). For example, if the job data allocated to one page of print medium is one page, the second conversion unit 426 expands the intermediate image data by an equal magnification or greater for each page, and if the color type is black and white, converts the color space from 3 dimensional to 1 dimensional.

Next, the print server 4 transmits print data to the printing execution printer (S11). In specific terms, the print server 4 transmits print data to the network address correlated to the printing execution printer identifier and stored by the printer management unit 427. When a plurality of printing execution printers is selected, print data is transmitted to each respective printing execution printer.

The printer 2a or the printer 2b that received the print data executes printing based on the received print data (S12). At the point that the execution instruction is received, the print server 4 can end the communication sequence with the smart phone 3, but it is also possible to have a print completion notification received from the printer, and to end the communication sequence with the smart phone 3 after print completion is notified to the smart phone 3 in accordance with the print completion notification.

With the first embodiment described above, when converting intermediate image data to print data, conversion is done to the print data using a process that expands by an equal magnitude or greater without reducing according to the printer resolution or the like, so damage of fine lines or the like due to reduction processing is prevented, and it is possible to suppress image quality degradation with lead-in printing. Also, since intermediate image data is generated by rendering before receiving the print execution instruction, compared to when converting to print data by rendering the job data after receiving the print execution instruction, it is possible to shorten the time from the print execution instruction until printing start. Furthermore, since print data adapted to the printing execution printer is generated for each printing execution printer, the versatility is high. Also, since intermediate image data that does not depend on printing conditions is generated, it is possible to do lead-in printing with any printing conditions. Also, when generating the intermediate image data before the printing conditions are selected, by the printing conditions being selected, when the job data allocated per page of print medium is 2 pages or greater, because intermediate image data of a pixel count for which the image is reduced during conversion from intermediate image data to print data is generated, it is possible to suppress image quality degradation. Also, since the user is able to manage job data using identification information, it is possible to prevent a person other than the user who transmitted the job data from obtaining the printing results. Also, since print data respectively adapted to each of a plurality of printing execution printers is generated based on one job data and are transmitted to the respective printing execution printers, it is possible to have printing executed by a plurality of printers with one job data transmission, and possible to reduce the capacity required for storing the intermediate image data.

2. Second Embodiment

Figure 5:
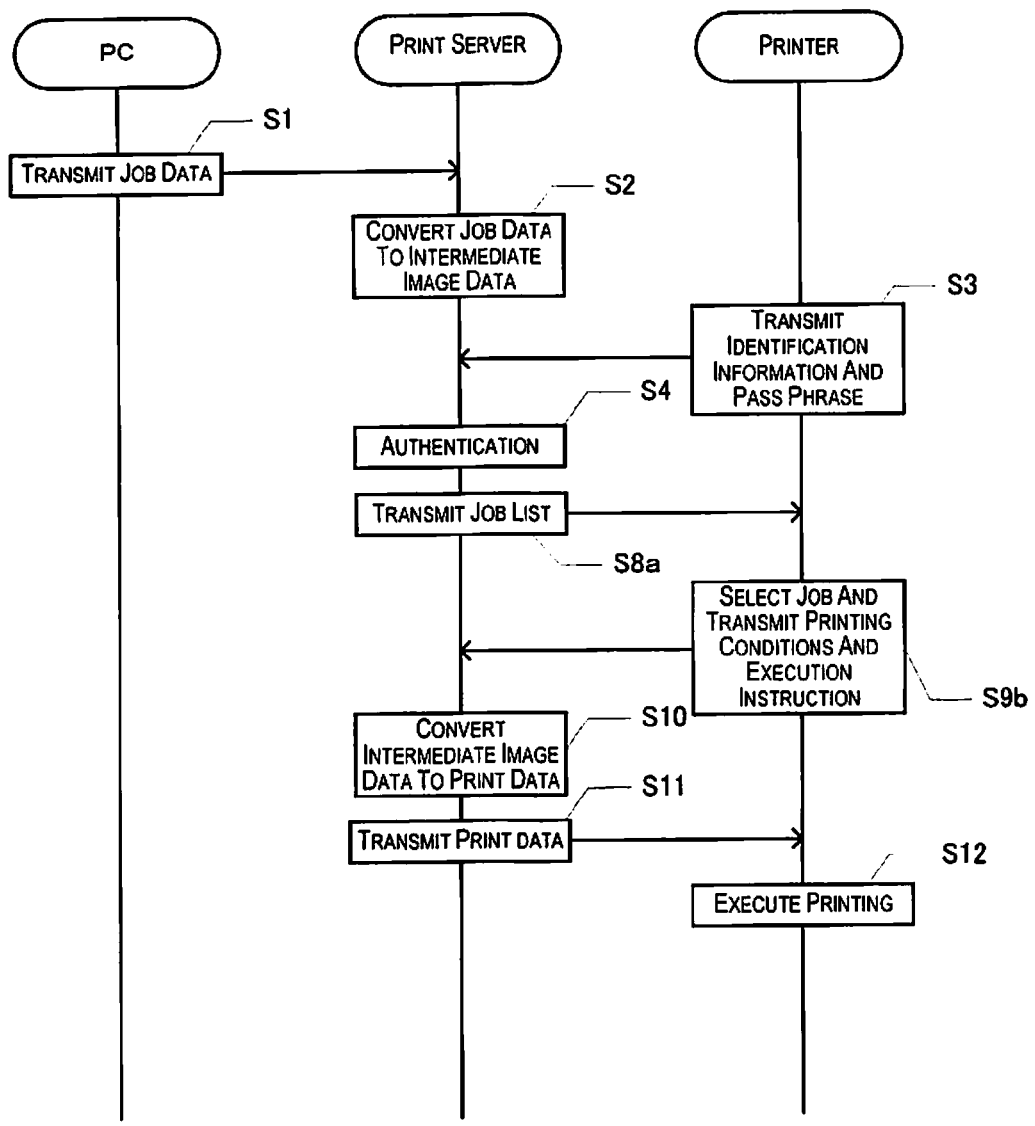
FIG. 5 is a sequence diagram of an embodiment of the present invention.

We will describe a second embodiment of the print management method using the print server 4 based on the sequence diagram shown in FIG. 5. For the user to acquire the printing results based on the job data transmitted himself, the user does not absolutely have to perform this at the location at which the printing execution printer is installed. In light of that, with the second embodiment, we will describe an example when, with the printer on which he wishes to execute printing, by the user operating that printer, that printer is specified as the printing execution printer, and the printing conditions are set. Specifically, the difference between the second embodiment from the first embodiment is the point of the printer itself functioning as the instruction terminal.

In specific terms, by the user operating the printer 2a or the printer 2b so as to have printing executed, his own identification information and pass phrase are input. Having done that, the printer 2a or the printer 2b transmits the input identification information and pass phrase to the print server 4.

When it receives the identification information and pass phrase, the print server 4 authenticates the user (S4), and returns a job list corresponding to the identification information (S8a). The printer 2a or the printer 2b that receives the job list has the user select the job and the printing conditions, and the job and printing conditions selected by the user are transmitted together with the execution instruction to the print server 4. In this way, it is also possible to transmit the job list before having the printing conditions selected. Also, since the user operates the printing execution printer itself and selects the printing execution printer and printing conditions, compared to when the smart phone 3 is the instruction terminal, by selecting the printing execution printer, it is possible to omit the operation of receiving the selectable printing conditions from the print server 4.

3. Other Embodiments

The technical scope of the present invention is not limited to the embodiments described above, and of course it is possible to add various modifications in a range that does not stray from the gist of the present invention.

For example, even when the pixel count to be input to the printer for the job data does not depend on the actually set printing conditions, as has already been described, this differs according to the design concept, but in addition to calculating with the maximum pixel count of each printer as the standard, or calculating with the default print settings of each printer as the standard, it is also possible to calculate by providing a common standard of some sort for the registered printers.

Also, of the pixel count to input to the plurality of printers for the job data, it is possible to generate intermediate image data that has a pixel count not only of the minimum pixel count, but also of less than the minimum pixel count.

Also, for example, the job data allocated per page of print medium is not limited to being 2 or more, and when printing conditions are set for which there will be reduction even when printing is executed based on the job data that specifies the printer from the start, specifically, when the user intentionally attempts to do reduced printing, it can also be controlled to be intermediate image data that is reduced when generating the print data.

Also, for example, the print server can be constituted using a standalone computer system, or can be constituted combining a plurality of computer systems. Also, part or all of the first conversion unit and the second conversion unit can be constituted using ASIC.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A print server connected to a plurality of printers including a first printer configured to receive print data with a prescribed pixel count that is smaller than pixel counts of print data to be received by the rest of the plurality of printers, the print server comprising:
   a job data receiving unit configured to receive job data subject to printing,
   a first conversion unit configured to convert the job data into intermediate image data having a pixel count equal to or less than the prescribed pixel count,
   an instruction receiving unit configured to, after the job data is received, receive an execution instruction for which one or more of the plurality of the printers is specified as a printing execution printer configured to execute printing of the job data,
   a second conversion unit configured to generate the print data corresponding to the printing execution printer by converting the intermediate image data to data of the pixel count to be input to the printing execution printer, and
   a transmission unit configured to transmit the print data to the printing execution printer.

2. The print server according to claim 1, wherein
   the first conversion unit is further configured to convert to the intermediate image data that is not dependent on printing conditions,
   the instruction receiving unit is further configured to receive the printing conditions, and
   the second conversion unit is further configured to generate the print data adapted to the printing conditions and the printing execution printer.

3. The print server according to claim 2, wherein
   the instruction receiving unit is further configured to receive the printing conditions including a page count of the job data allocated per page of print medium, and
   the second conversion unit is further configured to, when the job data allocated per page of the print medium is one page, generate the print data by expanding the intermediate image data by an equal magnification or greater, and when the job data allocated per page of the print medium is two pages or greater, generate the print data by reducing the intermediate image data.

4. The print server according to claim 1, wherein
   when a plurality of printing execution printers each of which is configured to execute the printing of the job data are selected,
   the second conversion unit is further configured to generate the print data for each of the printing execution printers, and
   the transmission unit is further configured to transmit the print data corresponding to each of the printing execution printers to each of the printing execution printers.

5. The print server according to claim 1, further comprising a job management unit configured to correlate and store the intermediate image data and an identification information, and correlate the identification information and the execution instruction when the execution instruction is received.

6. A printing system comprises:
   a plurality of printers including a first printer configured to receive print data with a prescribed pixel count that is smaller than pixel counts of print data to be received by the rest of the plurality of printers; and
   a print server connected to the plurality of the printers,
   the print server including
      a job data receiving unit configured to receive job data subject to printing,
      a first conversion unit configured to convert the job data into an intermediate image data having a pixel count equal to or less than the prescribed pixel count,
      an instruction receiving unit configured to, after the job data is received, receive an execution instruction for which one or more of the plurality of the printers is specified as a printing execution printer configured to execute printing of the job data,
      a second conversion unit configured to generate a print data corresponding to the printing execution printer by converting the intermediate image data to data of the pixel count to be input to the printing execution printer, and
      a transmission unit configured to transmit the print data to the printing execution printer,
   each of the plurality of the printers including
      a print data receiving unit configured to receive the print data, and
      a printing unit configured to execute printing based on the print data.

7. A non-transitory computer readable recording medium storing programs that cause a computer connected with a plurality of printers including a first printer, which is configured to receive print data with a prescribed pixel count that is smaller than pixel counts of print data to be received by the rest of the plurality of printers, to function as:
- a job data receiving unit configured to receive job data subject to printing;
- a first conversion unit configured to convert the job data into an intermediate image data having a pixel count equal to or less than the prescribed pixel count;
- an instruction receiving unit configured to, after the job data is received, receive an execution instruction for which one or more of the plurality of the printers is specified as a printing execution printer configured to execute printing of the job data;
- a second conversion unit configured to generate the print data corresponding to the printing execution printer by converting the intermediate image data to data of the pixel count to be input to the printing execution printer; and
- a transmission unit configured to transmit the print data to the printing execution printer.

\* \* \* \* \*